March 3, 1931.    E. J. ONDOLI    1,795,095
MOTOR CONTROL SYSTEM
Filed Oct. 29, 1924    2 Sheets-Sheet 1

INVENTOR
Ernesto José Ondoli
BY
Pennie, Davis, Marvin & Edmonds
ATTORNEYS

Patented Mar. 3, 1931

1,795,095

UNITED STATES PATENT OFFICE

ERNESTO JOSÉ ONDOLI, OF BUENOS AIRES, ARGENTINA

MOTOR-CONTROL SYSTEM

Application filed October 29, 1924. Serial No. 746,461.

This invention relates to certain improvements in the motor circuits of electric motor cars and locomotives, its object being to provide marked improvements in the circuits 5 heretofore used in such vehicles.

The invention is illustrated in the accompanying drawings in which Figs. 1 to 8 inclusive are diagrammatic views representing the various circuit changes which take place 10 during the control of the motors.

Figure 1:
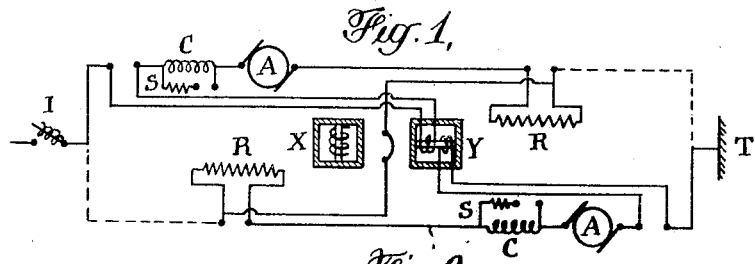
Figure 2:
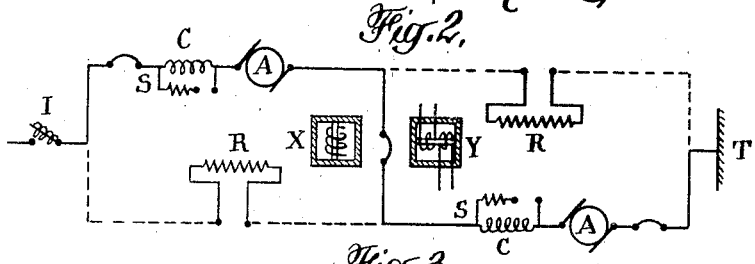

The invention consists mainly in the insertion of two induction coils X and Y in the 20 electric circuits as hereinafter described.

In the drawings I represents the main automatic switch operating in the well-known manner. A is the armature of the motors. In Figs. 1 to 8 inclusive the system comprises 25 two motors and in Fig. 9 only one motor is shown. The field coils of the motors are shown at C. The usual ohmic resistances for starting are represented at R and the ohmic shunt resistances for the fields are shown at 30 S. T represents the ground connection. The induction coils referred to above are shown at X and Y, X being a self induction coil and Y being a mutual induction coil.

Figure 11:
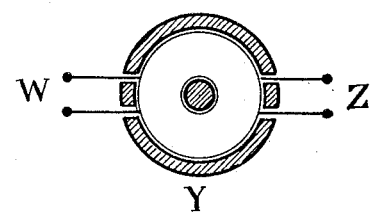
Fig. 11 is a transverse section of the induction coils employed.

The coils X and Y consist of an iron or 35 steel core with a completely closed magnetic circuit on which an insulated wire is wound. These coils are preferably completely enclosed in order to obtain the best results as is represented in Fig. 11. Another construc40 tion would be to have the windings on an iron sphere, the central nucleus of which is composed of thin iron sheets insulated from one another. If the magnetic circuit were not completely closed, as indicated in the draw45 ings, it would be necessary to have a special winding short circuited in order to obtain the necessary damping effect.

On the coil Y there are two or more separate windings according to the number of 50 motors in the system, whereas the device X comprises but a single coil for each pair of motors. The purpose of the mutual induction device Y and the manner in which its coils are connected in the circuit will first be described. 55

Figure 3:
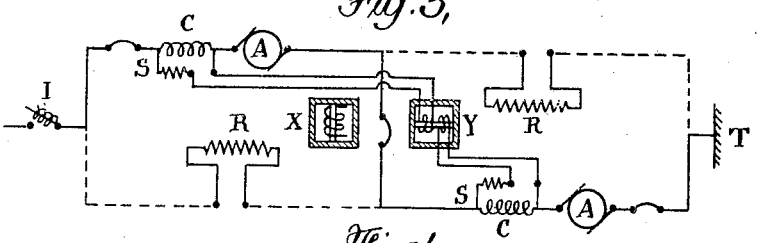
Figure 4:
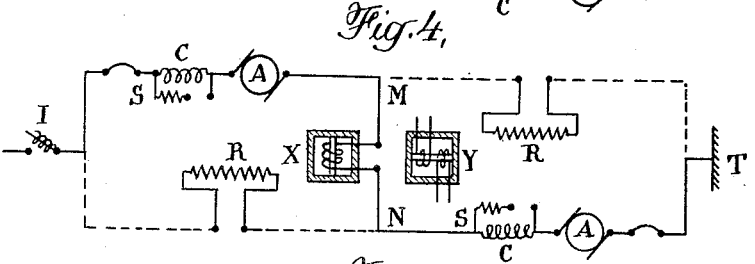
Figure 5:
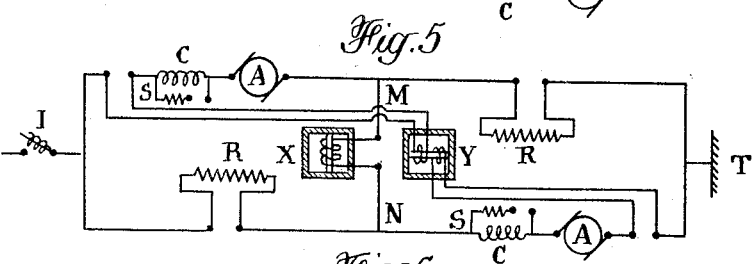
Figure 7:
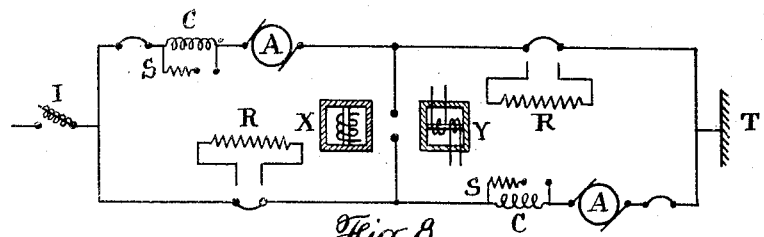
Figure 8:
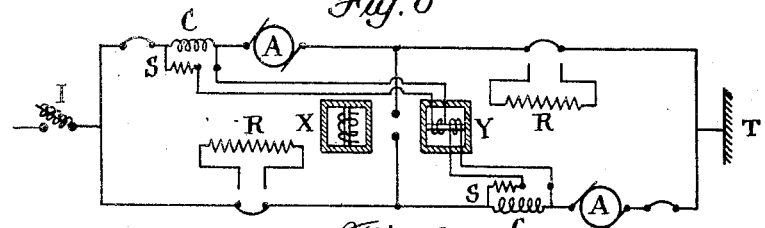

Fig. 1 represents the first point or position in the control of the motors. At this point the motors are in series in the entire motor circuit and each coil of the mutual induction device Y is connected in series with one of 60 the fields C. At this point in the operation of the motors the shunt resistances S are disconnected and the ohmic starting resistances R are in series with the motors. At the second point in the operation of the motors the 65 changes shown in Fig. 2 take place. As will be noted in this figure, the two coils of the mutual induction device Y are cut out of circuit and the starting resistances R have been cut out. The third point in the operation of 70 the motors is the final position with the motors in series. This position is represented in Fig. 3 in which the two coils of the mutual induction device Y have been inserted in series with the shunt resistances S. Figure 4 75 represents the preparatory point for passage of the motors from series to parallel connection. In this figure the two coils of the mutual induction device Y have been disconnected from the shunt resistances S and the 80 self-induction coil X inserted in series. Fig. 5 represents the point just before passage of the motors from series into parallel. At this point the two coils of the mutual induction device Y are again inserted in series with the 85 fields C and the starting resistances R are severally bridged around the motors. At the next point represented in Fig. 6 the motors have been switched to parallel. In this figure no change takes place in the connection 90 of the coils of the device Y as they are still in series with the fields C. This figure represents the first point in parallel, while Fig. 7 represents the second point in parallel, the 95 starting resistances R at this time being cut out of circuit, and the coils of the mutual induction device Y being also cut out of circuit. In Fig. 8, which represents the final position in parallel, the coils of the mutual 100 induction device Y are inserted in series with the shunt resistances S.

Figure 6:
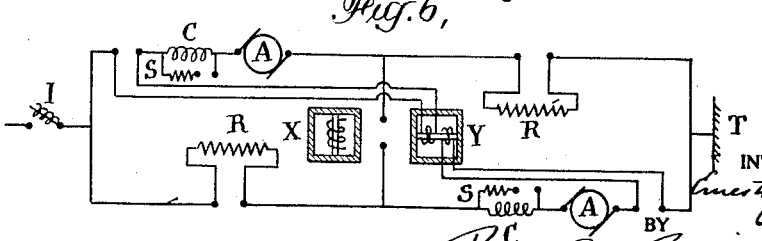

When the coils of the mutual induction device Y are connected as shown in Figs. 1, 5 and 6, due to the self induction of the winding, the mutual induction of one coil on the other and the reaction of the magnetic circuit causes the device to eliminate the jolting during a quick passage of the current, such as when the motors are first placed in the electric circuit or on the passage from the series to the parallel connection.

The elimination of the usual current fluctuations during starting allows the use of much smaller resistances with a consequent economy in the current.

When the motors are running at their normal speed with the fields shunted by the resistances S, the coils of the mutual induction device are in series with the shunted resistances as shown in Figs. 3 and 8. Under ordinary conditions without the coil Y if a break in the line is passed or the current is otherwise momentarily interrupted, the current upon being reestablished passes only through the shunt resistances S, owing to the fact that the fields present a slight inductive resistance. As this current does not pass through the fields the armature does not generate the necessary counter electromotive force for proper electric equilibrium and therefore violent sparking takes place at the commutator and the weak portions of the coils are likely to be burned out. By inserting the coils of the mutual induction device Y in series with the shunt resistances S as shown in Figs. 3 and 8, the above objection is eliminated because when there is any fluctuation in the current, for instance, when it is broken and subsequently reestablished, the coils of the mutual induction device Y offer a temporarily strong impedance to the passage of the current and allow only an insignificant portion of the current to pass through them. Consequently if the impedance of the coils of the device Y were sufficiently high, substantially all of the current would have to pass through the fields with a correspondingly strong magnetic flow, and under these circumstances the motor would generate a sufficiently high counter electro-motive force, and the motor would draw a minimum of current.

By providing the mutual induction device Y with two coils and utilizing the mutual induction of the coil of the second motor on the coil of the first and vice versa, the device may be made very small but will have a maximum of inductive power. Due to the fact that the induction coils are shunted across each field the speed of the motors may be raised to about three times normal value when the coil resistances are about one-third of that of the fields.

While the coils of the device Y have been shown and described as being inserted in series with the shunt resistances S, the windings of the device Y may be made of such ohmic resistance as to render unnecessary the shunt resistances S. In this case the coils of the device Y would be shunted directly across the fields C.

The purpose of the coil X and the manner of inserting it in the circuit will now be described. Up to the time of the 4th point in the operation of the motors, the coil X remains disconnected entirely. At the 4th point which is the preparatory point for passage of the motors from series to parallel, the coil X is inserted in the bridge M, N, as shown in Fig. 4. In Fig. 5, which represents the point just before passage of the motors into parallel, the coil X is still in the bridge, and in Fig. 6, which represents the first point in parallel, the coil X has again been disconnected from the bridge. Likewise in the subsequent points in parallel represented in Figs. 7 and 8, the coil X remains disconnected from the bridge. For every two motors one coil X is required.

It will therefore be seen that the coil X is inserted in the circuit between the first and second motors just before the motors are changed over to the parallel connection and is in the circuit during the changeover. It prevents the current supplied to the motors from passing through the bridge in the direction N, M, and eliminates the otherwise useless loss of current during the passage from the series to parallel connection with the bridge transition system. If this passage were effected when the motors were running at a higher rate of speed than that of the series point, the circuiting of the motors by the resistances R and the consequent sparking at the commutator would be prevented.

Figure 10:
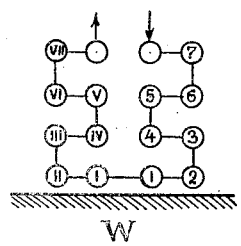
Fig. 10 is a diagrammatic view indicating the direction of winding of the induction 15 coils.

The shape of the winding, which should be as far as possible square in cross-section, contributes toward obtaining the results specified above. It is convenient to make the windings in two sections and to wind them in the direction numerically indicated in Fig. 10 wherein the successive turns of wire are indicated by the successive numerals.

Figure 9:
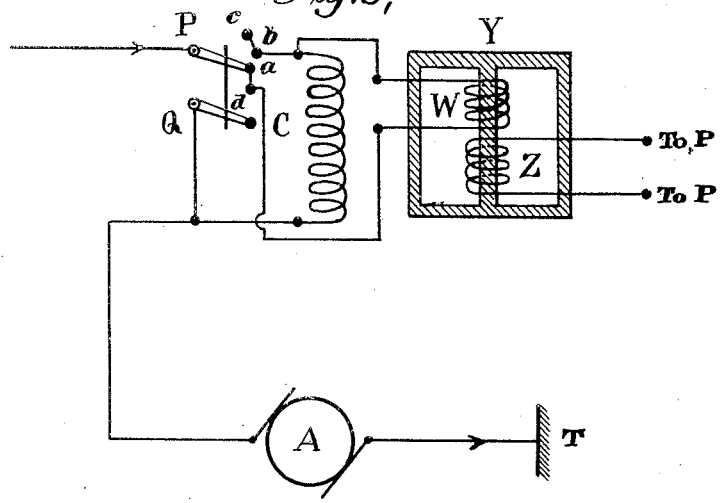
Fig. 9 is a diagrammatic view showing the invention applied to a single motor.

Fig. 9 shows the application of the invention to a single motor. In this case one of the windings W of the induction device Y is shunted across the field C by a switch having two arms represented at P and Q. The second winding Z should be suitably connected to the line voltage, the exact form of connection depending upon the character of the winding. When the motor in Fig. 9 is running at its normal speed the switch arm P is in contact with the switch point $c$ and the switch arm Q is in contact with the switch point $d$. The winding W is then shunted across the field C and the results above specified are obtained due to the mutual induction between the two coils. When the arms P and Q of the switch are in the position shown in the drawing, the coil W is in series with the field C, and when the arm P is in contact with the switch point $b$, the winding W is out of the circuit altogether. It will therefore be seen that the winding W may be shunted across the field C, may be connected in series with it, or may be disconnected from the circuit altogether in the same manner as described above in connection with Figs. 1 to 8 inclusive. The system shown in Fig. 9 may be used in any single motor system employed for industrial purposes.

The controlling means for producing the changes in the circuit shown in Figs. 1 to 8 is not shown in the drawings as it has no bearing on the invention. These changes may be effected by any suitable type of controller.

The arrangement illustrated in Figs. 1 to 9 inclusive in which the commutators of the armatures A are connected to the ground is much superior to the common practice of grounding the field coils because the field coils being placed ahead of the armatures operate as induction coils thus eliminating many fluctuations which would be objectionable if they were to reach the commutators.

Various modifications may be made in the system, arrangement and location of the parts without departing from the spirit and scope of the invention as defined in the accompanying claims.

I claim:

1. In an electric traction system, the combination of a plurality of electrically connected motors, ohmic starting resistances for the motors, and a mutual induction device having a plurality of coils one of which is connected in series with each of said resistances for starting.

2. In an electric traction system, the combination of a plurality of electric motors, means for connecting the motors in series or in parallel, ohmic starting resistances for the motors, and a mutual induction device having a plurality of coils one of which is connected in series with each of said resistances for starting.

3. In an electric traction system, the combination of a plurality of electric motors having field windings, ohmic starting resistances for the motors, and a mutual induction device having a plurality of coils one of which is connected in series with each of said field windings for starting.

4. In an electric traction system, the combination of a plurality of electric motors having field windings, a mutual induction device having a plurality of coils one of which is connected in shunt with each of said field windings, means for connecting said motors in series or in parallel by the bridge transition system, means for disconnecting the coils of said mutual induction devices from said field windings, and a self induction coil connected in series with said field windings during the transition period.

5. The method of transferring a plurality of series electric motors from series to parallel connections, said motors each having a field winding and an armature winding connected in series and a starting resistor, which comprises inserting one of a plurality of inductively related coils in series with the field winding of each of said motors and connecting all of said motors in series, cutting each of said coils and resistors out of circuit, and inserting one of said coils in parallel with the field winding of each of said motors, and connecting all of said motors in parallel.

ERNESTO JOSÉ ONDOLI.